(12) United States Patent
Durham et al.

(10) Patent No.: US 11,745,844 B2
(45) Date of Patent: Sep. 5, 2023

(54) AIRCRAFT AND SYSTEMS THEREFOR

(71) Applicant: Hybrid Air Vehicles Limited, Bedford (GB)

(72) Inventors: Michael Durham, Bedford (GB); Paul Macey, Langport (GB)

(73) Assignee: Hybrid Air Vehicles Limited

( * ) Notice: Subject to any disclaimer, the term of this patent is extended or adjusted under 35 U.S.C. 154(b) by 111 days.

(21) Appl. No.: 17/609,275

(22) PCT Filed: May 7, 2020

(86) PCT No.: PCT/GB2020/051133
§ 371 (c)(1),
(2) Date: Nov. 5, 2021

(87) PCT Pub. No.: WO2020/229800
PCT Pub. Date: Nov. 19, 2020

(65) Prior Publication Data
US 2022/0227469 A1   Jul. 21, 2022

(30) Foreign Application Priority Data
May 10, 2019   (GB) ...................................... 1906606

(51) Int. Cl.
*B64B 1/62*      (2006.01)
*B64B 1/40*      (2006.01)
*G01F 17/00*     (2006.01)

(52) U.S. Cl.
CPC .................. *B64B 1/62* (2013.01); *B64B 1/40* (2013.01); *G01F 17/00* (2013.01)

(58) Field of Classification Search
CPC .............. B64B 1/40; B64B 1/62; G01F 17/00
See application file for complete search history.

(56) References Cited

U.S. PATENT DOCUMENTS

| 6,196,498 B1 | 3/2001 | Eichstedt et al. |
| 6,293,493 B1 | 9/2001 | Eichstedt et al. |

(Continued)

FOREIGN PATENT DOCUMENTS

| CN | 106240784 A | 12/2016 |
| CN | 108263591 A | 7/2018 |

(Continued)

OTHER PUBLICATIONS

Patent Cooperation Treaty, "International Search Report", Int'l Application No. PCT/GB2020/051133, dated Oct. 29, 2020, 5 pages.

(Continued)

*Primary Examiner* — Tye William Abell
(74) *Attorney, Agent, or Firm* — Clement A. Berard, Esq.; Dann, Dorfman, Herrell & Skillman, PC

(57) ABSTRACT

A non-rigid airship or hybrid air vehicle has a pressure-stabilised envelope (100) that includes at least one ballonet (102, 103). A system is provided for measuring the geometry of the lifting gas enclosure (101) within the pressure-stabilised envelope (100). The system comprises a plurality of sensors (104, 109) located outside the ballonet(s) but inside the envelope, for measuring the geometry of the enclosure. Some of the sensors (104) are arranged to measure an internal surface of the pressure-stabilised envelope (100), and others of the sensors (109) are arranged to measure an external surface of the at least one ballonet (102, 103).

25 Claims, 2 Drawing Sheets

(56) References Cited

U.S. PATENT DOCUMENTS

| | | |
|---|---|---|
| 6,302,357 B1 | 10/2001 | Kalisz |
| 6,315,242 B1 | 11/2001 | Eichstedt et al. |
| 7,500,637 B2 | 3/2009 | Marimon et al. |
| 8,016,229 B2 | 9/2011 | Greiner et al. |
| 8,177,161 B2 | 5/2012 | Morehead et al. |
| 8,459,589 B2 | 6/2013 | Barnes et al. |
| 8,474,746 B2 | 7/2013 | van Helden |
| 8,777,156 B2 | 7/2014 | Piini et al. |
| 8,864,068 B1 | 10/2014 | Pasternak |
| 9,132,904 B2 | 9/2015 | Durham |
| 9,592,906 B2 | 3/2017 | Durham et al. |
| 11,433,984 B2* | 9/2022 | Walker .................. B64B 1/62 |
| 11,623,725 B2* | 4/2023 | Smith .................. B64B 1/70 |
| | | 244/75.1 |
| 2004/0155149 A1* | 8/2004 | Dossas .................. B64B 1/62 |
| | | 244/128 |
| 2010/0102163 A1* | 4/2010 | Van Helden .............. B64B 1/60 |
| | | 165/44 |
| 2013/0035894 A1* | 2/2013 | Greiner .................. G01F 17/00 |
| | | 702/150 |
| 2014/0263827 A1* | 9/2014 | Smith .................. G05D 1/0808 |
| | | 244/96 |
| 2021/0016867 A1* | 1/2021 | Michaelis, IV .......... B64B 1/60 |

FOREIGN PATENT DOCUMENTS

| | | |
|---|---|---|
| DE | 102007043770 A1 | 3/2009 |
| GB | 2583760 A | 11/2020 |
| JP | 2011093422 A | 5/2011 |
| WO | 2014210393 A1 | 12/2014 |
| WO | 2020229800 A1 | 11/2020 |

OTHER PUBLICATIONS

UK Intellectual Property Office, "Search Report", Application No. GB 1906606.7, dated Oct. 22, 2019, 1 page.

* cited by examiner

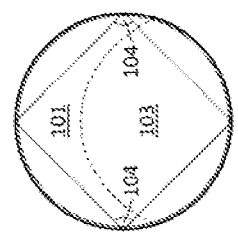
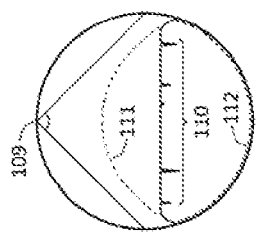
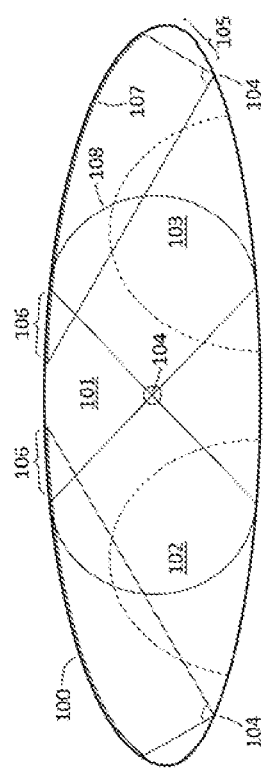
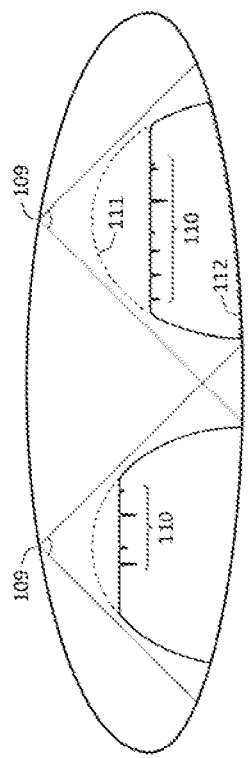

AIRCRAFT AND SYSTEMS THEREFOR

This Application is the U.S. National Phase under 35 U.S.C. § 371 of PCT Application No. PCT/GB2020/051133 filed 7 May 2020, entitled "AIRCRAFT AND SYSTEMS THEREFORE," which claims the priority and benefit of Great Britain Application No. GB 1906606.7 filed 10 May 2019; this U.S. National Phase Application claims the benefit and the priority of each of the foregoing applications which are hereby incorporated by reference herein in their entireties.

BACKGROUND TO THE INVENTION

This invention relates to a system for determining the trim state of an airship or hybrid air vehicle (i.e. an aircraft in which lift can be achieved both aerostatically and aerodynamically), and to an airship or hybrid air vehicle including such a system.

The invention is applicable to non-rigid airships and to hybrid air vehicles that utilise a pressure-stabilised envelope. These types of aircraft utilise a buoyant lifting gas (e.g. helium) contained inside a flexible envelope that is inflated to maintain its surfaces in a state of tension and thus achieve pressure-stabilisation.

In order to maintain the structural integrity of the aircraft, the envelope must be regulated within a prescribed pressure range by the operation of an envelope pressure control system. The latter typically incorporates a plurality of air fans and one or more air valves, which are used to regulate the envelope pressure by inflating or deflating one or more flexible air compartments ("ballonets") located inside the envelope.

In addition to this pressure regulation function, the envelope pressure control system typically provides an ability to vary the distribution of air between two or more ballonets to alter the longitudinal position of the aircraft's centre of gravity (i.e. the aircraft's longitudinal trim state).

Non-rigid airships and hybrid air vehicles are typically configured to fly at weights greater than can be fully supported by the buoyant force provided by the lifting gas contained inside the aircraft's envelope. The excess vehicle weight (or "heaviness") typically varies in the course of a flight, for example, due to the consumption of fuel, release of payload, or reduction in the purity/quantity of lifting gas contained inside the envelope.

In order to exert full and safe control over an airship or hybrid air vehicle, it is necessary for the pilot to possess accurate knowledge of the current heaviness and trim state of the aircraft.

The aircraft heaviness is directly influenced by magnitude of the buoyant lift force, which is governed by the total volume that the lifting gas displaces inside the envelope, excluding the volume(s) occupied by the air ballonet compartment(s).

Similarly, the aircraft trim state is directly influenced by the net point of action of the buoyant lift force, which is governed by the geometric distribution of the lifting gas inside the envelope, excluding the volume(s) occupied by the air ballonet compartment(s).

Consequently, it is desirable to be able to determine both the total volume and the geometric distribution of the envelope's lifting gas compartments to optimise the control of the airship or hybrid air vehicle.

In known systems, baseline values for aircraft weight and balance are measured on the ground prior to flight, or, when feasible, in stable flight conditions. Changes from baseline weight and balance values may be computed using current measurements of lifting gas temperature, purity and humidity, ballonet air contents, fuel quantity, ballast weight and payload distribution. Distortion of the external size or shape of the aircraft's pressure-stabilised envelope is not taken into account when computing current aircraft weight and balance.

Until recent years the fill status of the ballonets was primarily conducted via visual monitoring of physical markings on the fabric of the ballonets allied to pressure sensing of the air head within the ballonets. Both of these sources of data were then used in conjunction with conversion charts or similar to establish a calculated centre of gravity/centre of buoyancy for the airship.

It is possible to use passive sensors, e.g. optical, pressure or mechanical sensors to quantify ballonet fill status. Thus it is possible to determine the ballonet air contents by measuring the pressure differential between the ballonet and the adjacent lifting gas. In JP 2011-093422 A, such sensors are proposed to be located outside the aircraft's pressure-stabilised envelope, e.g. on the underside of an air cell which functions as a ballonet.

US 2013/0035894 A1 describes systems and methods for measuring ballonet volumes, using active sensors, e.g. laser, sonic, or radar sensors, located within the ballonets, to measure the ballonet geometry.

A problem with this is that the ballonet fabric effectively lies on top of the bubble of air within the ballonet and, given the nature of difference in densities between the air and the helium, this bubble fills the ballonet from the bottom up to a level corresponding to the totality of the air in the ballonet, but with the feature of a flattened upper surface. Typically, folds of excess fabric form and hang from the underside of this flattened upper surface whenever the ballonet is in a partially filled state. These folds make accurate measurement of the contents of the ballonet very difficult as they mask off, deflect and/or corrupt some of the height measuring signals returning to the sensors in the bottom of the ballonet.

Another fundamental issue with measuring ballonet contents from within the ballonets is that when the airship is close to its maximum operating altitude the sensors are very close to the sensed surface and, with even small amounts of pitch on the hull, the sensors become ineffective at measuring the quantity of air left in the ballonet.

There is a further problem with measuring ballonet geometry to determine the centre of buoyancy of the hull, namely that the measured ballonet volume must be subtracted away from a theoretical hull geometry, and if this does not match the actual hull geometry, an error is introduced.

SUMMARY OF THE INVENTION

We have found that the total volume and the geometric distribution of the envelope's lifting gas compartments may be derived most accurately by direct measurement of the surfaces that bound them, as opposed to measuring and subtracting ballonet volume(s) from an assumed approximation of the gross envelope shape.

The invention provides a system for measuring the geometry of a lifting gas enclosure within a pressure-stabilised envelope of an aircraft, namely a non-rigid airship or hybrid air vehicle, that includes at least one ballonet, the system comprising a plurality of sensors located outside the ballonet but inside the envelope, for measuring the geometry of the enclosure, wherein some of the sensors are arranged to measure an internal surface of the pressure-stabilised envelope, and others of the sensors are arranged to measure an external surface of the at least one ballonet. The sensors may be located at different positions along both longitudinal and transverse axes of the envelope. Said others of the sensors may be located above the at least one ballonet.

The location of the sensors of the invention is advantageous in that they enable the external surface of the ballonet(s) to be surveyed without interference from the internal folds of fabric that form when the ballonet is operating in a partially filled state.

Furthermore, this arrangement enables a single measurement sensor to encompass a ballonet's entire upper surface across all ballonet fill states, from the ballonet being completely filled to completely empty.

The system may include a module arranged to automatically compute, from the geometry of the enclosure, aircraft heaviness and centre of gravity position to a requisite level of accuracy for safe and controlled flight.

The computed aircraft heaviness and centre of gravity position may be provided to the aircraft's crew and may optionally be used to automatically operate aircraft flight control, envelope pressurisation and undercarriage systems.

At least one of the sensors may be arranged to quantify a 1-dimensional distance to a single point on the envelope or ballonet. At least one of the sensors may be arranged to quantify a 2-dimensional variation in distance along a surface curve. At least one of the sensors may be arranged to quantify a 3-dimensional variation in distance over a surface area.

In one embodiment, the sensors are immersed in the lifting gas. In an alternative embodiment, the sensors are located inside at least one separate sealed compartment, and are arranged to operate through an aperture or window in said compartment.

A plurality of additional measurement sensors may be provided to survey the shape of the envelope, including the bottom surfaces of the ballonet(s), by means of distributed contact across a surface. These sensors may conform to the internal side or the external side of the aircraft's pressure-stabilised envelope.

One or more further sensors, located inside or outside the envelope, may be provided to measure additional characteristics that enhance the accuracy of the heaviness and centre of gravity computations. The further sensors may measure at least one of purity of the envelope's lifting gas contents, inflation pressure, temperature or humidity of the envelope's lifting gas contents or ballonet air contents, ambient atmospheric pressure, aircraft air speed, aircraft attitude, aircraft acceleration, quantity and location(s) of fuel or ballast weight carried by the aircraft, ground contact forces and ground contact locations reacted by an undercarriage of the aircraft, or thrust loads imparted by the aircraft's propulsion system.

The system may utilise payload, ballast or other discrete weight data that is input by the aircraft's crew prior to aircraft take off and updated as applicable during flight.

The operation of the system may be checked and calibrated in static conditions, taking into account external forces applied to the aircraft by mooring attachments, ballast weights, undercarriage and propulsion systems.

The system may operate in real time, or near to real time, by computing instantaneous data readings from the sensors.

The system may incorporate information derived by averaging a series of instantaneous data readings over a period of time, as provided by one or more of the sensors.

Input data to the system may be derived by taking simultaneous readings from two or more independent ones of the sensors and calculating an average value for trim computation.

Input data to the system may be derived by taking the readings from two or more independent ones of the sensors and using an algorithm to select an optimal subset of readings for trim computation.

The system may display subsidiary information derived from sensors to enable the aircraft's crew to monitor and regulate the operation of the aircraft's envelope pressure control system.

The system may be arranged to indicate the time history of the computed aircraft heaviness and centre of gravity information over a duration of interest (e.g. 1 minute).

The system may be arranged to indicate the magnitude of any short term dynamic variation in the computed aircraft heaviness and centre of gravity information (e.g. occurring over the prior period of 30 seconds).

The system may be arranged to indicate the accuracy or reliability of the computed aircraft heaviness and centre of gravity information.

The system may be arranged to provide a warning to the aircraft crew if the values of one or more calculation parameters exceed prescribed limits. The warning may provide further information concerning at least one of: any malfunction of primary components of the hull pressure control system such as ballonet inflation fans, pressure relief valves, or sensors; any significant reduction in the quantity of lifting gas contained inside the aircraft's envelope; any significant change in ballonet air volume that is not consistent with commanded operation of the hull pressure control system in prevailing atmospheric conditions.

The system may be arranged to disconnect any signals being fed to the aircraft flight control or envelope pressurisation systems in the event that the values of one or more calculation parameters cannot be determined with sufficient accuracy or reliability.

The system may be arranged to create a record of at least one system parameter over an extended duration (e.g. over hours, days, weeks, or months of operation) and to make the record available, e.g. for download, to support diagnostic or scheduled maintenance operations.

The invention also provides an airship or hybrid air vehicle having the system described above.

BRIEF DESCRIPTION OF THE DRAWINGS

Embodiments of the invention will now be described solely by way of example and with reference to the accompanying drawings, in which:

FIGS. 1A and 1B are schematic longitudinal and transverse sections respectively through the pressure-stabilised envelope of an aircraft according to the invention, showing a first subset of the sensors;

FIGS. 2A and 2B are further schematic longitudinal and transverse sections respectively through the envelope of FIGS. 1A and 1B, showing a second subset of the sensors;

DETAILED DESCRIPTION OF PARTICULAR EMBODIMENTS

Figure 3A:
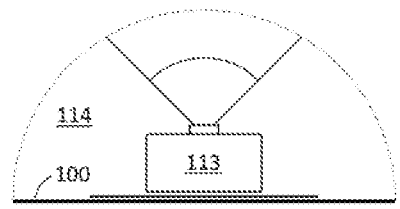
FIG. 3A schematically shows a sensor disposed on the surface of the pressure-sensitive envelope.

FIGS. 1A and 1B show a typical non-rigid airship or hybrid air vehicle envelope 100 of flexible material that contains a volume of buoyant lifting gas 101 and a number of air ballonets 102, 103. The volume of air inside the ballonets can be adjusted to regulate the pressure of the buoyant lifting gas, to form the flexible envelope 100 into a pressure stabilised structure.

Measurement sensors, e.g. laser, radiofrequency or sonic sensors, are installed inside the envelope, to enable the volume and geometric distribution of the lifting gas to be determined. A first subset of the measurement sensors 104 is in this example arranged around the periphery of the envelope. The areas surveyed by these sensors may exclude some regions of the envelope surface 105, or include overlapping areas 106 covered by more than one sensor.

Individual measurement sensors may determine distance to a single point in one dimension (not shown), or distance variations across a planar profile 107 in two dimensions, or distance variations over a surface 108 in three dimensions.

FIGS. 2A and 2B show a second subset of the measurement sensors 109, arranged to survey the exterior surfaces of the air ballonets, sensing through the lifting gas volume from one or more surrounding locations. These locations are advantageous in that the measurements are not subject to interference from internal folds of fabric 110 that typically form when a ballonet is operating in a partially filled state. Furthermore, this arrangement enables a single measurement sensor to encompass a ballonet's entire upper surface with any ballonet fill state, from completely full 111 to completely empty 112 (shown in phantom lines). Putting the sensors above the ballonets in the gas space results in the sensors looking down on the flat upper surface of the ballonet (with the folds of fabric effectively on the face away from the sensor) allowing a much cleaner view of the ballonet shape and hence volume.

Figure 3B:
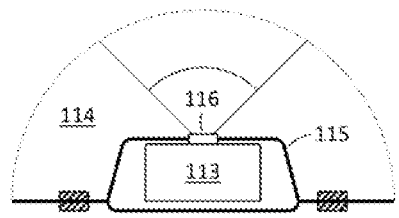
FIG. 3B schematically shows a sensor located inside a sealed compartment.

FIG. 3A shows how one of the sensors 113 may be immersed in the lifting gas 114. FIG. 3B shows an alternative installation of a sensor, inside a separate sealed compartment 115 that incorporates an aperture or window 116 for the sensor to operate through.

Figure 4A:
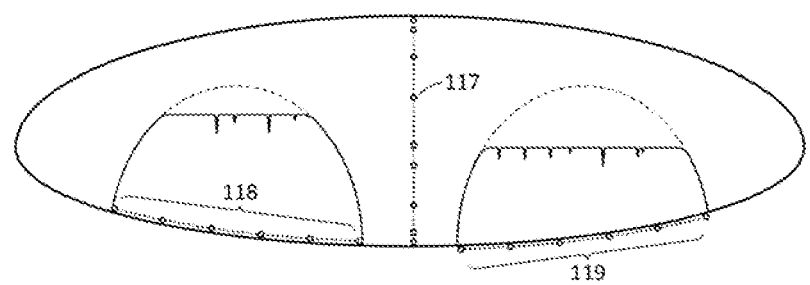
FIGS. 4A and 4B are further schematic longitudinal and transverse sections respectively through the envelope of FIGS. 1A and 1B, showing additional optional sensors.
Figure 4B:
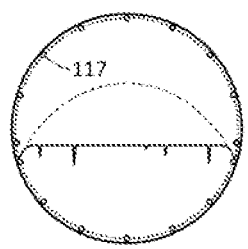

FIG. 4 shows further optional subsets of the measurement sensors, arranged to survey the shape of the envelope, including the bottom surfaces of the ballonets, by means of distributed contact across a surface. Sensors 117 may be arranged in a ring as shown, and sensors may conform to the internal side 118, or the external side 119 of the aircraft's pressure-stabilised envelope at the locations of the ballonets.

The system may include any of the additional sensors, trim calculation features and warning modes described above.

The geometric measurements of the envelope surface(s) and the ballonet exterior surface(s) are used by the aircraft trim calculation system of the invention to compute the volume and centre-of-gravity position of the lifting gas contained inside the aircraft's envelope, typically to an accuracy of 1.0%, or better.

This direct measurement of lifting gas geometry improves the accuracy of the computed lifting gas mass properties by taking into account distortions in envelope shape resulting from different aircraft loading configurations, ballonet fill states and flight conditions. The invention therefore removes the potential error that is inherent in the known indirect method of measurement of hull geometry via ballonet contents.

By using both longitudinal and lateral arrays of sensors, the system of the invention establishes the cross section of the gas space at several points along the length of the hull. Whilst it might be assumed that the hull would always be circular, it should be noted that, in actual fact, the hull cross section varies depending on (a) forces imparted by aircraft structural features, (b) the weight of its gas contents and (c) external aerodynamic forces. All these have an effect on the cross sectional shape of the hull and, hence, its volume and location of the centre of helium lift. This knowledge is captured according to the invention by the sensors within the helium space.

The invention claimed is:

1. A system for measuring the geometry of a lifting gas enclosure within a pressure-stabilised envelope of an aircraft, namely a non-rigid airship or hybrid air vehicle, that includes at least one ballonet, the system comprising:
a plurality of sensors located outside the ballonet but inside the envelope, for measuring the geometry of the enclosure, wherein some of the sensors are arranged to measure an internal surface of the pressure-stabilised envelope, and others of the sensors are arranged to measure an external surface of the at least one ballonet.

2. The system according to claim 1, wherein the sensors are located at different positions along both longitudinal and transverse axes of the envelope.

3. The system according to claim 1, wherein said others of the sensors are located above the at least one ballonet.

4. The system according to claim 1, wherein at least one of the sensors is arranged to quantify a 1-dimensional distance to a single point on the envelope or ballonet.

5. The system according to claim 1, wherein at least one of the sensors is arranged to quantify a 2-dimensional variation in distance along a surface curve.

6. The system according to claim 1, wherein at least one of the sensors is arranged to quantify a 3-dimensional variation in distance over a surface area.

7. The system according to claim 1, wherein the sensors are immersed in lifting gas.

8. The system according to claim 1, wherein the sensors are located inside at least one separate sealed compartment, and are arranged to operate through an aperture or window in said compartment.

9. The system according to claim 1, including one or more further sensors, provided to measure at least one of purity of the envelope's lifting gas contents, inflation pressure, temperature or humidity of the envelope's lifting gas contents or ballonet air contents, ambient atmospheric pressure, aircraft air speed, aircraft attitude, aircraft acceleration, quantity and location(s) of fuel or ballast weight carried by the aircraft, ground contact forces and ground contact locations reacted by an undercarriage of the aircraft, or thrust loads imparted by the aircraft's propulsion system.

10. The system according to claim 1, arranged to utilise payload, ballast or other discrete weight data that is input by the aircraft's crew prior to aircraft take off and updated as applicable during flight.

11. The system according to claim 1, arranged to compute instantaneous data readings from the sensors.

12. The system according to claim 1, arranged to average a series of instantaneous data readings over a period of time, as provided by one or more of the sensors.

13. The system according to claim 1, wherein input data to the system is derived by taking simultaneous readings from two or more independent ones of the sensors and calculating an average value for trim computation.

14. The system according to claim 1 wherein input data to the system is derived by taking the readings from two or more independent ones of the sensors and using an algorithm to select an optimal subset of readings for trim computation.

15. The system according to claim 1, arranged to provide a warning to aircraft crew concerning at least one of: any malfunction of primary components of the hull pressure control system such as ballonet inflation fans, pressure relief valves, or sensors; any significant reduction in the quantity of lifting gas contained inside the aircraft's envelope; any significant change in ballonet air volume that is not consistent with commanded operation of the hull pressure control system in prevailing atmospheric conditions.

16. The system according to claim 1, arranged to create a record of at least one system parameter over an extended duration and to make the record available to support diagnostic or scheduled maintenance operations.

17. The system according to claim 1, including a plurality of additional measurement sensors, provided to survey the shape of the envelope, including the bottom surfaces of the ballonet(s), by means of distributed contact across a surface.

18. The system according to claim 17, wherein the additional measurement sensors conform to an internal side of the aircraft's pressure-stabilised envelope.

19. The system according to claim 17, wherein the additional measurement sensors conform to an external side of the aircraft's pressure-stabilised envelope.

20. The system according to claim 1, including a module arranged to automatically compute, from the geometry of the enclosure and pilot input data, aircraft heaviness and centre of gravity position.

21. The system according to claim 20, arranged to indicate, for the computed aircraft heaviness and centre of gravity information, at least one of: time history over a duration of interest, magnitude of any short term dynamic variation, accuracy or reliability.

22. The system according to claim 20, arranged to provide the computed aircraft heaviness and centre of gravity position to aircraft crew.

23. The system according to claim 22, arranged to use the computed aircraft heaviness and centre of gravity position to automatically operate at least one of an aircraft flight control system, an envelope pressurisation system or an undercarriage system.

24. The system according to claim 23, arranged to cease automatic operation of the aircraft flight control system, envelope pressurisation system or undercarriage system in the event that values of one or more calculation parameters cannot be determined with sufficient accuracy or reliability.

25. An airship or hybrid air vehicle including:
a lifting gas enclosure defined by a pressure-stabilised envelope;
at least one ballonet within the pressure-stabilised envelope; and
a system comprising a plurality of sensors located outside the at least one ballonet but inside the envelope, for measuring the geometry of the enclosure, wherein some of the sensors are arranged to measure an internal surface of the pressure-stabilised envelope, and others of the sensors are arranged to measure an external surface of the at least one ballonet.

* * * * *